(12) United States Patent
Kim et al.

(10) Patent No.: US 12,481,262 B2
(45) Date of Patent: Nov. 25, 2025

(54) COOKTOP APPLIANCE WITH PROTECTED USER DETECTION

(71) Applicant: Haier US Appliance Solutions, Inc., Wilmington, DE (US)

(72) Inventors: Jihwan Kim, Seoul (KR); Jinwoo Park, Seoul (KR); Wonmyung Seo, Seongnam (KR)

(73) Assignee: Haier US Appliance Solutions, Inc., Wilmington, DE (US)

(*) Notice: Subject to any disclaimer, the term of this patent is extended or adjusted under 35 U.S.C. 154(b) by 313 days.

(21) Appl. No.: 18/164,985

(22) Filed: Feb. 6, 2023

(65) Prior Publication Data

US 2024/0264575 A1  Aug. 8, 2024

(51) Int. Cl.
*G05B 19/042* (2006.01)
*F24C 1/00* (2006.01)

(52) U.S. Cl.
CPC ............ *G05B 19/0428* (2013.01); *F24C 1/00* (2013.01); *G05B 2219/2643* (2013.01)

(58) Field of Classification Search
CPC ........ G05B 19/0428; G05B 2219/2643; F24C 1/00; F24C 7/083
See application file for complete search history.

(56) References Cited

U.S. PATENT DOCUMENTS

| | | | |
|---|---|---|---|
| 10,380,881 B2 | 8/2019 | Xu et al. | |
| 2008/0181172 A1* | 7/2008 | Angelhag | G01S 5/14 370/328 |
| 2011/0309933 A1* | 12/2011 | Marino | G01S 5/02521 340/539.32 |
| 2014/0364103 A1* | 12/2014 | Marti | H04W 4/029 455/418 |
| 2015/0161835 A1* | 6/2015 | Jablokov | H04Q 9/00 340/5.61 |
| 2018/0321652 A1* | 11/2018 | Jablokov | G05B 19/042 |
| 2021/0239823 A1* | 8/2021 | VanBlon | G01S 13/46 |
| 2021/0321241 A1* | 10/2021 | Peterson | G08B 21/12 |
| 2022/0005337 A1 | 1/2022 | Shin et al. | |

OTHER PUBLICATIONS

Y. Lin, Y. Gao, B. Li and W. Dong, "Revisiting Indoor Intrusion Detection With WiFi Signals: Do Not Panic Over a Pet!," in IEEE Internet of Things Journal, vol. 7, No. 10, pp. 10437-10449, Oct. 2020, published May 13, 2020, doi: 10.1109/JIOT.2020.2994101, 3 pages, Abstract Only.

Hanson, Hilary, "South Korean Officials Warn That Cats Have Been Starting Fires By Turning On Stoves", https://www.huffpost.com/entry/south-korea-cats-stoves-fires_n_6ld09b28e4b0c7d8b8a4ac99, Jan. 1, 2022, 3 pages.

* cited by examiner

*Primary Examiner* — Christopher E. Everett
(74) *Attorney, Agent, or Firm* — Dority & Manning, P.A.

(57) ABSTRACT

A method of operating a cooktop appliance includes receiving an input at a user interface of the cooktop appliance and initiating a cooking operation of the cooktop appliance in response to the input. The method further includes determining, after initiating the cooking operation, whether a protected user is present at the cooktop appliance and an authorized user is absent from the cooktop appliance.

16 Claims, 7 Drawing Sheets

COOKTOP APPLIANCE WITH PROTECTED USER DETECTION

FIELD OF THE INVENTION

The present subject matter relates generally to cooktop appliances, such as oven appliances which include a cooktop, standalone cooktop appliances, and other similar cooktop appliance. More particularly, the present subject matter relates to systems and methods for detecting protected users of such cooktop appliances.

BACKGROUND OF THE INVENTION

Oven appliances generally include a cabinet that defines a cooking chamber for cooking food items therein, such as by baking or broiling the food items. To heat the cooking chamber for cooking, oven appliances include one or more heating elements positioned in the cooking chamber, such as at a top portion, bottom portion, side portion, or combinations thereof, in the cooking chamber. Some oven appliances also include a convection heating element and fan for convection cooking cycles. The heating element or elements may be used for various cycles of the oven appliance, such as a preheat cycle, a cooking cycle, or a self-cleaning cycle. A cooktop may be provided on a top panel of the cabinet. The cooktop typically includes multiple heating elements or burners for receipt of cooking utensils thereon.

Because of the high temperatures generated by such heating elements and burners in the cooking chamber and/or on the cooktop, operation of the oven appliance by certain users may be undesirable.

Accordingly, an oven appliance with improved features for restricting or preventing protected users from operating the oven appliance unattended would be useful. More particularly, an oven appliance that is capable of identifying a protected user, and methods of identifying a protected user, would be useful.

BRIEF DESCRIPTION OF THE INVENTION

Aspects and advantages of the invention will be set forth in part in the following description, or may be apparent from the description, or may be learned through practice of the invention.

In an exemplary embodiment, a method of operating a cooktop appliance is provided. The method includes receiving an input at a user interface of the cooktop appliance and initiating a cooking operation of the cooktop appliance in response to the input. The method further includes determining, after initiating the cooking operation, whether a protected user is present at the cooktop appliance and an authorized user is absent from the cooktop appliance.

In another exemplary embodiment, a cooktop appliance is provided. The oven appliance includes a controller. The controller is operable for receiving an input from a user interface of the cooktop appliance and initiating a cooking operation of the cooktop appliance in response to the input. The controller is further operable for determining, after initiating the cooking operation, whether a protected user is present at the cooktop appliance and an authorized user is absent from the cooktop appliance.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
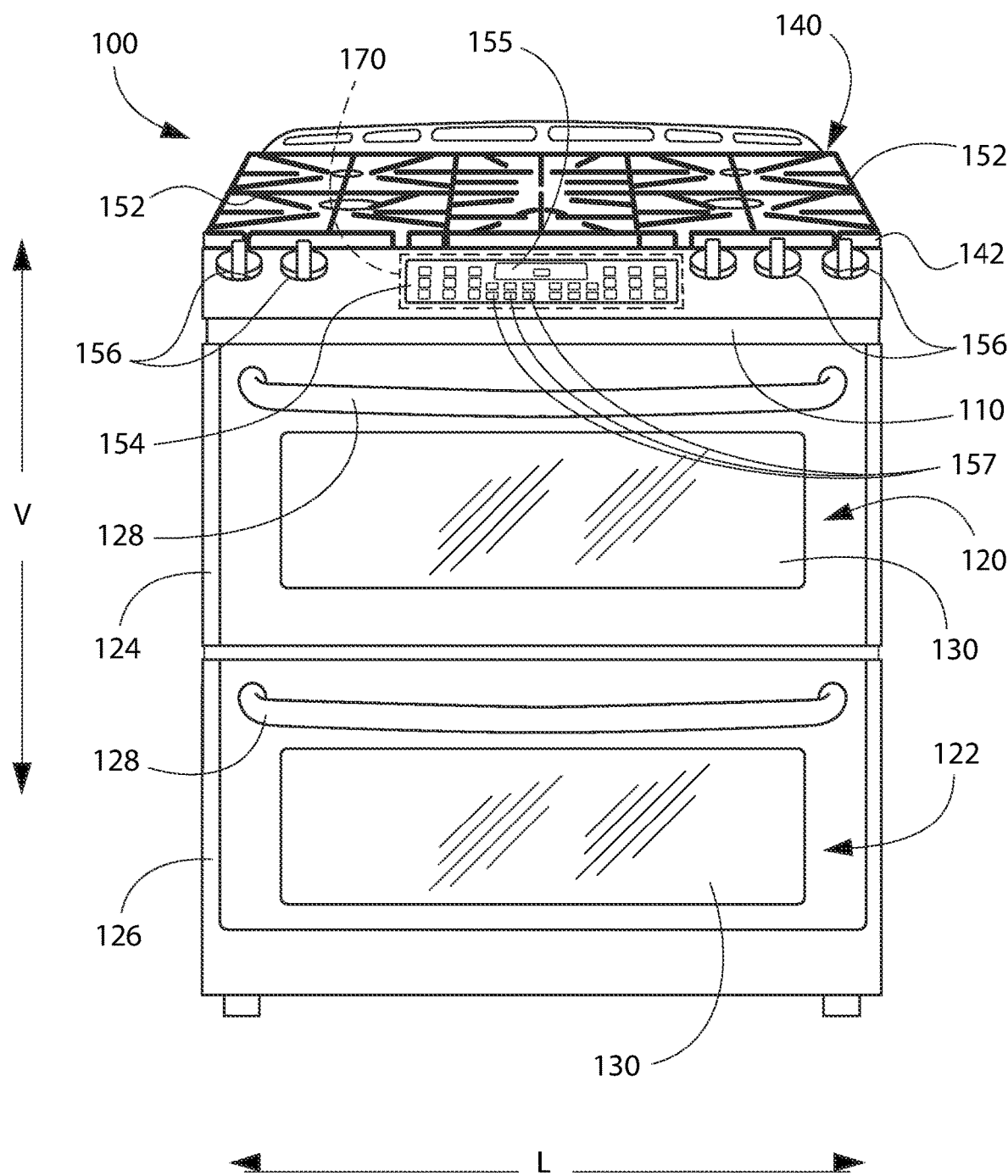
FIG. 1 provides a front, perspective view of a range appliance having a cooktop according to one or more example embodiments of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Directional terms such as "left" and "right" are used herein with reference to the perspective of a user standing in front of the cooktop appliance 100 to access the cooktop and/or items thereon. Terms such as "inner" and "outer" refer to relative directions with respect to the interior and exterior of the oven appliance, and in particular the cooking chamber(s) defined therein. For example, "inner" or "inward" refers to the direction towards the interior of the oven appliance. Terms such as "left," "right," "front," "back," "top," or "bottom" are used with reference to the perspective of a user accessing the oven appliance. For example, a user stands in front of the oven appliance to open the door(s) and reaches into the cooking chamber(s) to add, move, or withdraw items therein.

As used herein, the terms "first," "second," and "third" may be used interchangeably to distinguish one component from another and are not intended to signify location or importance of the individual components. As used herein, terms of approximation, such as "generally," or "about"

include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counterclockwise.

Figure 2:
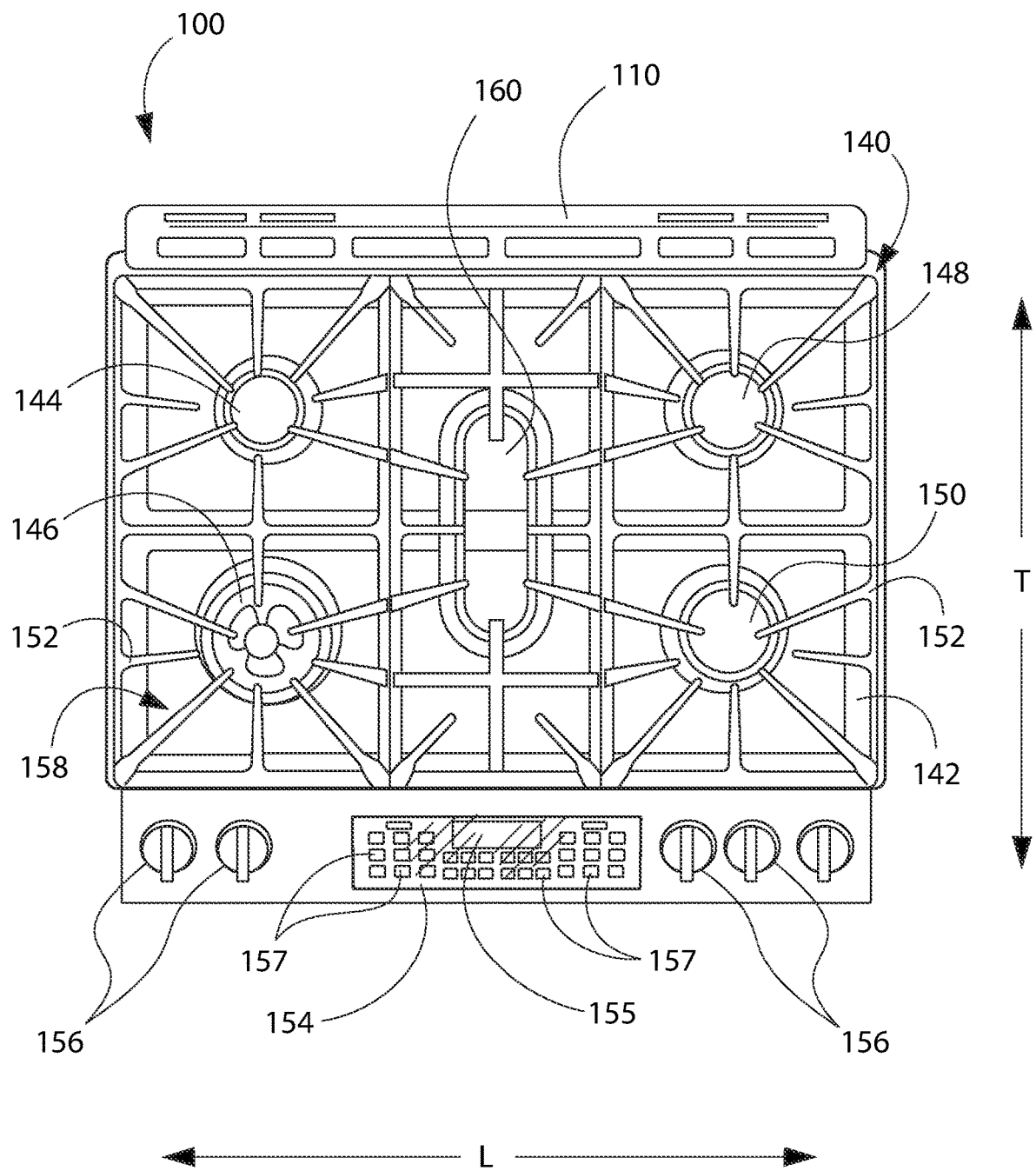
FIG. 2 provides a top, plan view of the example appliance of FIG. 1.

FIG. 1 provides a front, perspective view of a cooktop appliance 100 as may be employed with the present subject matter. FIG. 2 provides a top, plan view of cooktop appliance 100. As illustrated in FIGS. 1 and 2, the example cooktop appliance 100 includes an insulated cabinet 110. Cabinet 110 defines an upper cooking chamber 120 and a lower cooking chamber 122. Thus, this particular exemplary cooktop appliance 100 is generally referred to as a double oven range appliance. As will be understood by those skilled in the art, the illustrated range appliance is an embodiment of a cooktop appliance and is provided by way of example only, and the present subject matter may be used in any suitable cooktop appliance, e.g., a single oven range appliance or a standalone cooktop appliance. In other exemplary embodiments of the present disclosure, the cooktop appliance may include a single cooking chamber, or no cooking chamber at all, such as a stand-alone cooktop appliance, e.g., which may be built in to a countertop. Thus, the example embodiment shown in FIG. 1 is not intended to limit the present subject matter to any particular cooking chamber configuration or arrangement (or even the presence of a cooking chamber at all, e.g., as in the case of a standalone cooktop appliance).

Upper and lower cooking chambers 120 and 122 are configured for the receipt of one or more food items to be cooked. Cooktop appliance 100 includes an upper door 124 and a lower door 126 rotatably attached to cabinet 110 in order to permit selective access to upper cooking chamber 120 and lower cooking chamber 122, respectively. Handles 128 are mounted to upper and lower doors 124 and 126 to assist a user with opening and closing doors 124 and 126 in order to access cooking chambers 120 and 122. As an example, a user can pull on handle 128 mounted to upper door 124 to open or close upper door 124 and access upper cooking chamber 120. Glass window panes 130 provide for viewing the contents of upper and lower cooking chambers 120 and 122 when doors 124 and 126 are closed and also assist with insulating upper and lower cooking chambers 120 and 122. Heating elements (not shown), such as electric resistance heating elements, gas burners, microwave heating elements, halogen heating elements, or suitable combinations thereof, are positioned within upper cooking chamber 120 and lower cooking chamber 122 for heating upper cooking chamber 120 and lower cooking chamber 122.

Cooktop appliance 100 also includes a cooktop 140. Cooktop 140 is positioned at or adjacent to a top portion of cabinet 110. Thus, cooktop 140 is positioned above upper and lower cooking chambers 120 and 122. Cooktop 140 includes a top panel 142. By way of example, top panel 142 may be constructed of glass, ceramics, enameled steel, and combinations thereof.

For cooktop appliance 100, a utensil 18 (snot shown) holding food and/or cooking liquids (e.g., oil, water, etc.) may be placed onto grates 152 at a location of any of burner assemblies 144, 146, 148, 150, and/or 160. Burner assemblies 144, 146, 148, 150, 160 provide thermal energy to cooking utensils on grates 152. As shown in FIG. 2, burner assemblies 144, 146, 148, 150 and 160 can be configured in various sizes so as to provide e.g., for the receipt of cooking utensils (i.e., pots, pans, griddle, etc.) of various sizes and configurations and to provide different heat inputs for such cooking utensils. Grates 152 are supported on a cooking surface, e.g., top surface 158 of top panel 142. Cooktop appliance 100 includes various burner assemblies, e.g., circular burner assemblies 144, 146, 148, and 150, and also includes an elongated griddle burner 160 positioned at a middle portion of top panel 142, as may be seen in FIG. 2. A griddle may be positioned on grates 152 and heated with griddle burner 160.

A user interface panel 154 is located within convenient reach of a user of the cooktop appliance 100. For this example embodiment, cooktop appliance 100 also includes knobs 156 that are each associated with one of burner assemblies 144, 146, 148, 150 and griddle burner 160. Knobs 156 allow the user to activate each burner assembly and determine the amount of heat input provided by each burner assembly 144, 146, 148, 150 and griddle burner assembly 160 to a cooking utensil located thereon. The user interface panel 154 may also include one or more inputs 157, such as buttons or a touch pad or touchscreen, for selecting or adjusting operation of the cooktop appliance 100, such as for selecting or initiating a cooking mode. User interface panel 154 may also be provided with one or more graphical display devices 155 that deliver certain information to the user such as e.g., whether a particular burner assembly is activated and/or the temperature at which the burner assembly is set.

Although shown with knobs 156, it should be understood that knobs 156 and the configuration of cooktop appliance 100 shown in FIG. 1 is provided by way of example only. More specifically, cooktop appliance 100 may include various input components, such as one or more of a variety of touch-type controls, electrical, mechanical or electro-mechanical input devices including rotary dials, push buttons, touch pads and/or a touchscreen (e.g., the touchscreen may provide both the display 155 and inputs 157). The user interface panel 154 may include other display components, such as a digital or analog display device 155, designed to provide operational feedback to a user.

As may be seen in FIG. 1, cooktop appliance 100 may include a processing device or controller 170 and the operation of cooktop appliance 100 may be controlled by the controller 170. Controller 170 may be communicatively coupled with a control panel or user interface panel 154 as well as the display 155 and user inputs 157. Controller 170 may also be communicatively coupled with various operational components of cooktop appliance 100 as well, such as burner assemblies 144, 146, 148, 150 and 160, knobs 156, temperature sensors, cameras, speakers, and microphones, etc. Input/output ("I/O") signals may be routed between controller 170 and the various operational components of cooktop appliance 100. Thus, controller 170 can selectively activate and operate these various components. Various components of cooktop appliance 100 are communicatively coupled with controller 170 via one or more communication lines, such as, e.g., signal lines, shared communication busses, or wirelessly.

Controller 170 includes one or more memory devices and one or more processors (not labeled). The processors can be any combination of general or special purpose processors, CPUs, or the like that can execute programming instructions or control code associated with operation of cooktop appliance 100. The memory devices may represent random access memory such as DRAM or read only memory such as ROM or FLASH. In one embodiment, the processor executes programming instructions stored in memory. The memory may be a separate component from the processor or may be included onboard within the processor. Alternatively, controller 170 may be constructed without using a processor, e.g., using a combination of discrete analog and/or digital logic circuitry (such as switches, amplifiers, integrators, comparators, flip-flops, AND gates, and the like) to perform control functionality instead of relying upon software. Controller 170 may include a network interface such that controller 170 can connect to and communicate over one or more networks with one or more network nodes. Controller 170 can also include one or more transmitting, receiving, and/or transceiving components for transmitting/receiving communications with other devices communicatively coupled with cooktop appliance 100. Additionally or alternatively, one or more transmitting, receiving, and/or transceiving components can be located off board controller 170. Controller 170 can be positioned in a variety of locations throughout cooktop appliance 100. For this embodiment, controller 170 is located proximate user interface panel 154 toward the top portion of cooktop appliance 100.

As noted above, the configuration of cooktop appliance 100 illustrated in FIGS. 1 and 2 is by way of example only, and aspects of the present disclosure may also be used with other cooking appliances, such as cooktop appliances, wall ovens, or various other oven appliances having different heating elements, such as gas burners on the cooktop and/or other heating elements, such as electric burners on the cooktop, e.g., resistance heating elements, induction heating elements, etc., as well as variations in the number or size of burners, or variations in the location, position, or type of controls on the user interface, among numerous other possible variations in the configuration of the cooktop appliance 100 within the scope of the present disclosure.

Using the teachings disclosed herein, one of skill in the art will understand that the present subject matter can be used with other types of cooktop appliances, e.g., as described above. Accordingly, other configurations of cooktop appliance 100 could be provided, it being understood that the configurations shown in the accompanying FIGS. and the description set forth herein are by way of example for illustrative purposes only.

Figure 3:
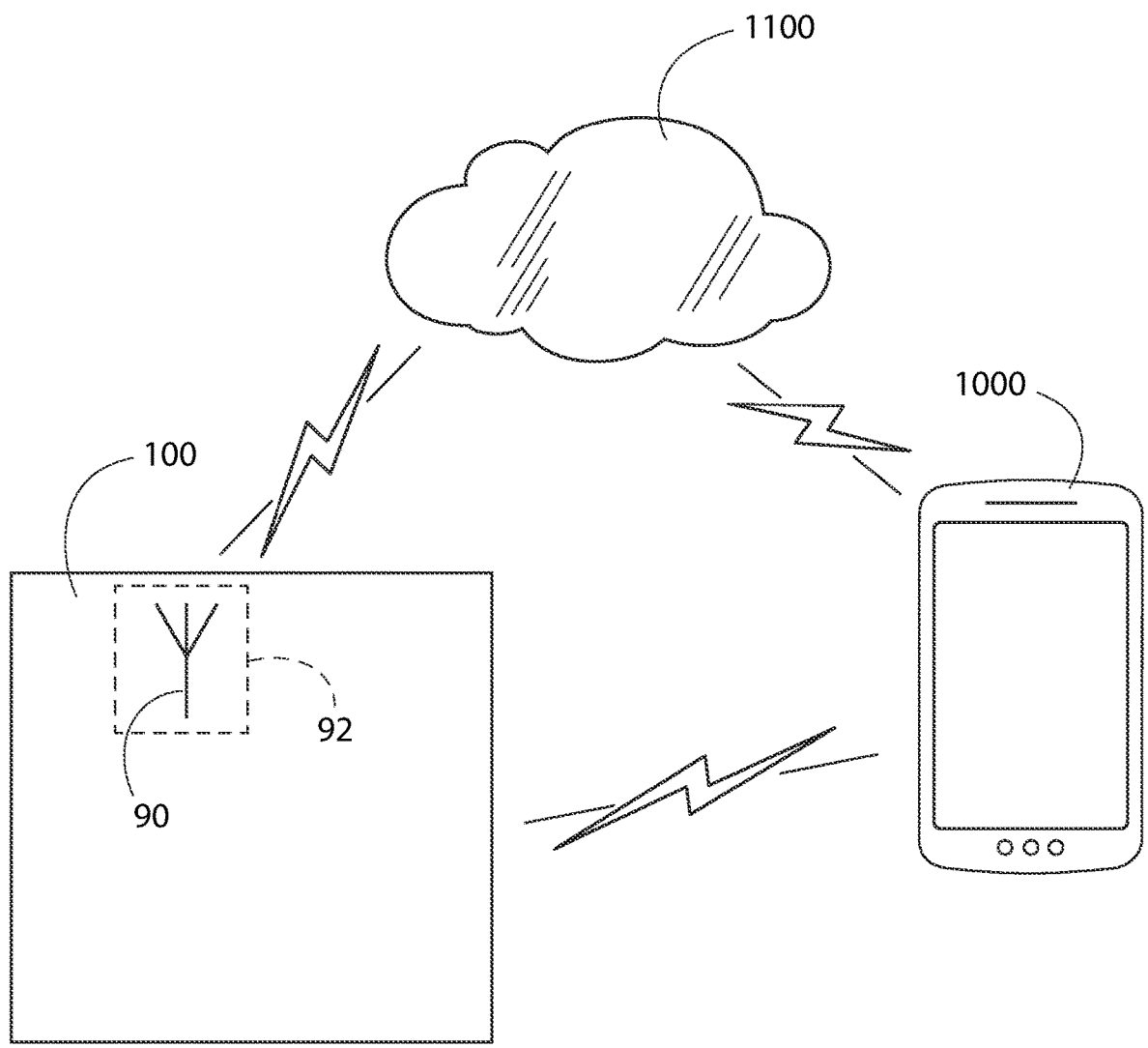
FIG. 3 provides a diagrammatic illustration of a cooktop appliance in communication with a remote computing device and with a remote user interface device according to one or more exemplary embodiments of the present subject matter.

Turning now to FIG. 3, a general schematic is provided of a cooktop appliance 100, which communicates wirelessly with a remote user interface device 1000 and a network 1100. For example, as illustrated in FIG. 3, the cooktop appliance 100 may include an antenna 90 by which the cooktop appliance 100 communicates with, e.g., sends and receives signals to and from, the remote user interface device 1000. The antenna 90 may be part of, e.g., onboard, a communications module 92. The communications module 92 may be a wireless communications module operable to connect wirelessly, e.g., over the air, to one or more other devices via any suitable wireless communication protocol. For example, the communications module 92 may be a WI-FI® module, a BLUETOOTH® module, or a combination module providing both WI-FI® and BLUETOOTH® connectivity. The remote user interface device 1000 may be a laptop computer, smartphone, tablet, personal computer, wearable device, smart home system, and/or various other suitable devices.

The cooktop appliance 100 may be in communication with the remote user interface device 1000 device through various possible communication connections and interfaces. The cooktop appliance 100 and the remote user interface device 1000 may be matched in wireless communication, e.g., connected to the same wireless network. The cooktop appliance 100 may communicate with the remote user interface device 1000 via short-range radio such as BLUETOOTH® or any other suitable wireless network having a layer protocol architecture. As used herein, "short-range" may include ranges less than about ten meters and up to about one hundred meters. For example, the wireless network may be adapted for short-wavelength ultra-high frequency (UHF) communications in a band between 2.4 GHz and 2.485 GHz (e.g., according to the IEEE 802.15.1 standard). In particular, BLUETOOTH® Low Energy, e.g., BLUETOOTH® Version 4.0 or higher, may advantageously provide short-range wireless communication between the cooktop appliance 100 and the remote user interface device 1000. For example, BLUETOOTH® Low Energy may advantageously minimize the power consumed by the exemplary methods and devices described herein due to the low power networking protocol of BLUETOOTH® Low Energy.

Figure 4:
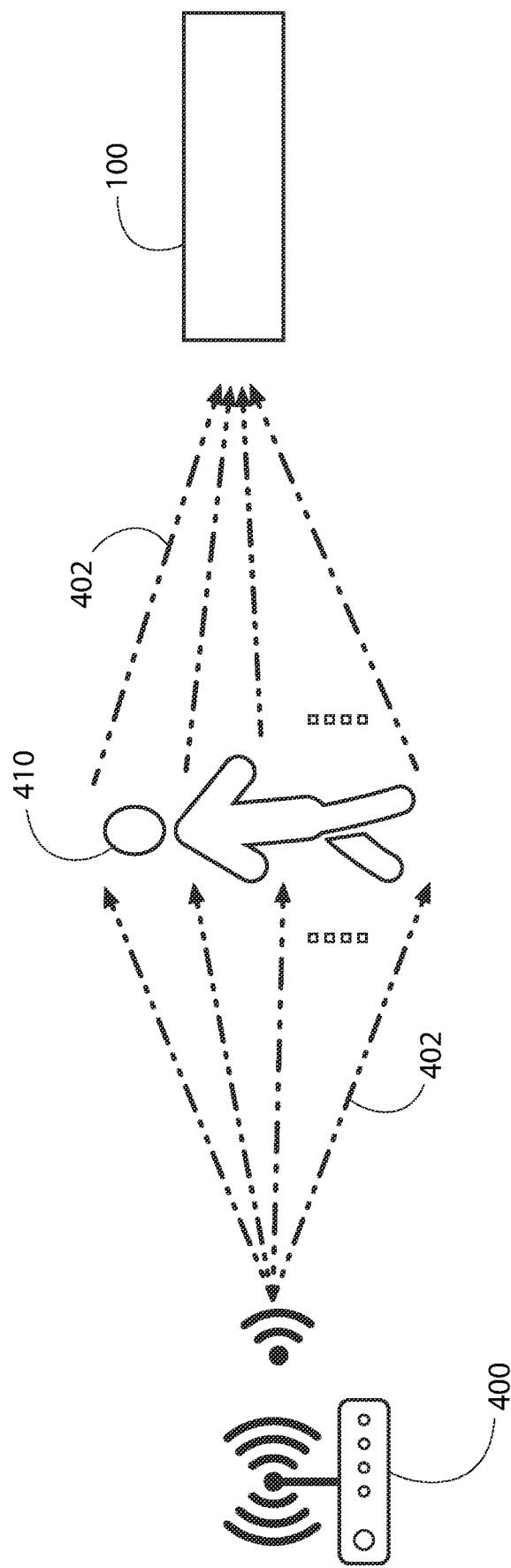
FIG. 4 provides a diagrammatic illustration of a wireless signal which may be used with one or more exemplary embodiments of the present subject matter.

The remote user interface device 1000 is "remote" at least in that it is spaced apart from and not physically connected to the cooktop appliance 100, e.g., the remote user interface device 1000 is a separate, stand-alone device from the cooktop appliance 100 which communicates with the cooktop appliance 100 wirelessly. Any suitable device separate from the cooktop appliance 100 that is configured to provide and/or receive communications, information, data, or commands from a user may serve as the remote user interface device 1000, such as a smartphone (e.g., as illustrated in FIG. 4), smart watch, personal computer, smart home system, or other similar device. For example, the remote user interface device 1000 may be a smartphone operable to store and run applications, also known as "apps," and some or all of the method steps disclosed herein may be performed by a smartphone app.

The remote user interface device 1000 may include a memory for storing and retrieving programming instructions. Thus, the remote user interface device 1000 may provide a remote user interface which may be an additional user interface to the user interface panel 154. For example, the remote user interface device 1000 may be a smartphone operable to store and run applications, also known as "apps," and the additional user interface may be provided as a smartphone app.

As mentioned above, the cooktop appliance 100 may also be configured to communicate wirelessly with a network 1100. The network 1100 may be, e.g., a cloud-based data storage system including one or more remote computing devices such as remote databases and/or remote servers, which may be collectively referred to as "the cloud." For example, the cooktop appliance 100 may communicate with the cloud 1100 over the Internet, which the cooktop appliance 100 may access via WI-FIR, such as from a WI-FI® access point in a user's home.

An exemplary wireless communication system is diagrammatically illustrated in FIG. 4. As shown in FIG. 4, the wireless communication system may include a transmitter, such as a WI-FI® router 400, which sends a signal 402, e.g., a multi-channel signal as illustrated in FIG. 4, such as a WI-FI® signal, to a receiver, e.g., the cooktop appliance 100. As will be recognized by those of ordinary skill in the art, such wireless communication may be two-way communication, e.g., the cooktop appliance 100 may also send signal(s) to the router 400, although only signal 402 from the router 400 to the cooktop appliance 100 is illustrated in FIG. 4 for the sake of clarity. Also as may be seen in FIG. 4, the signal 402 may be obstructed or impeded by intervening objects between the router 400 and the cooktop appliance 100. Some such obstructions may be moving objects, such as an adult human 410 as schematically depicted in FIG. 4, while the moving obstruction may also be a human child or pet, or other similar person or animal.

The degree of obstruction of the signal may be proportional to the size of the person or animal moving between the router 400 and the cooktop appliance 100, such that, for example, an adult human may be differentiated from a child or pet based on the wireless signal, e.g., based on the decrease in wireless signal strength over time, such as during a time preceding an activation of, or other interaction with, the cooktop appliance. For example, as a user approaches the cooktop appliance 100, the user obstructs some of the wireless signal received by the cooktop appliance 100, and the extent or degree to which the wireless signal strength is diminished while the user approaches the cooktop appliance, such as immediately prior to an interaction with the cooktop appliance 100 or within a time threshold prior to the interaction, may be used to differentiate an adult human from other, smaller, users who may interact with the cooktop appliance 100, such as child who may play with the cooktop appliance 100 or a cat who may jump on the cooktop appliance 100, etc. For example, the adult human may be an authorized user who is considered to have a level of judgement and responsibility sufficient to safely use the cooktop appliance 100, whereas other users, e.g., human children or pets, may be protected users, and it may be undesirable for such protected users to operate the cooktop appliance 100 unattended, e.g., when an authorized user is not present.

Figure 5:
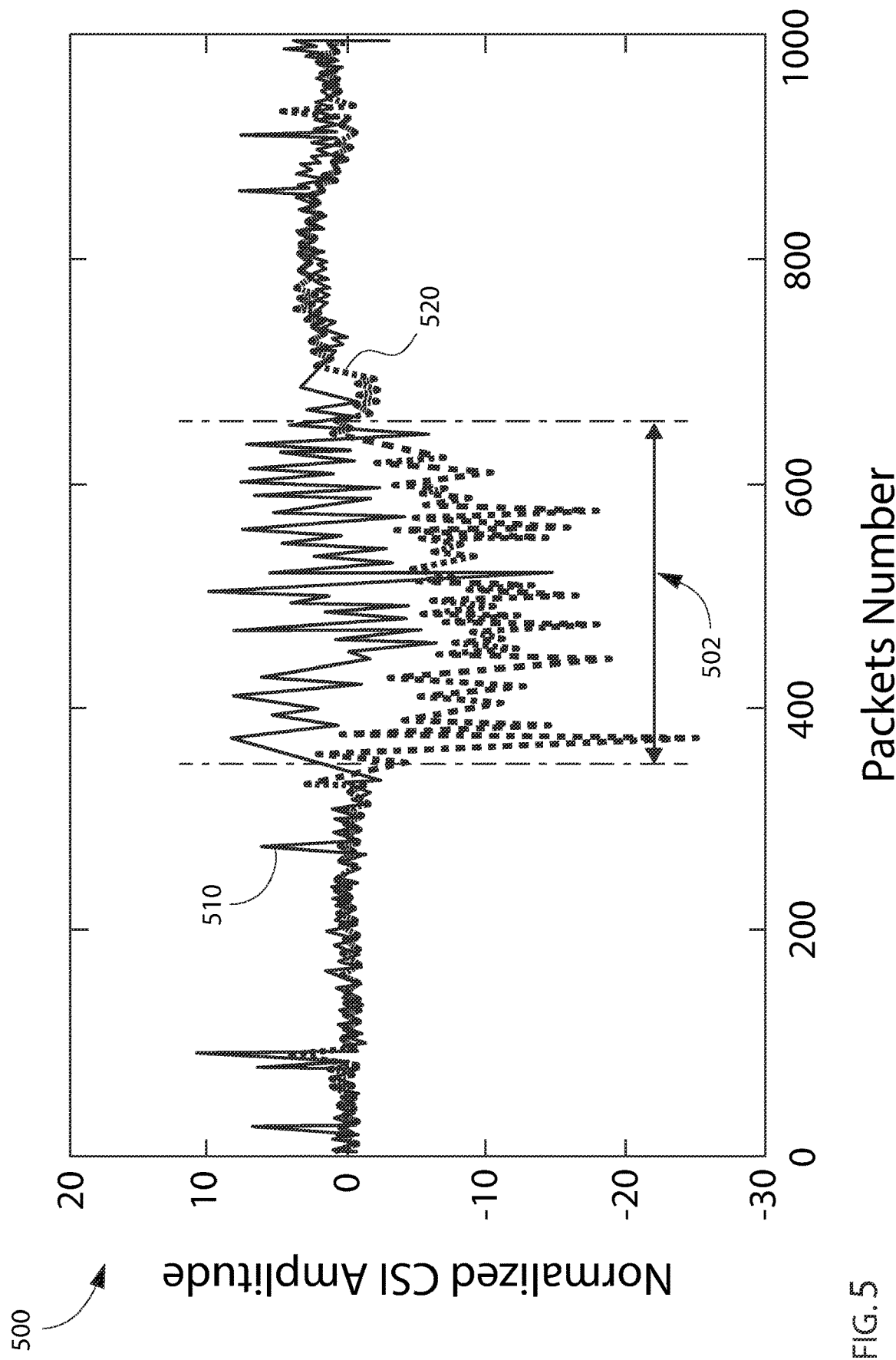
FIG. 5 provides an exemplary diagram of wireless signal strength over time such as may be used with one or more exemplary embodiments of the present subject matter.

A graph 500 of signal strength over time (where time is measured in this example with reference to chronologically sequential packet numbers in each signal) for exemplary wireless signals, e.g., first wireless signal 510 and second wireless signal 520, is provided in FIG. 5. It should be understood that the time span illustrated for each wireless signal 510 and 520 may be simultaneous, but is not necessarily simultaneous, rather, the time span is based on the chronological sequence of packets received by the cooktop appliance in each wireless signal 510 and 520 prior to an interaction, e.g., activation, from a user. Thus, the packet numbers provided along the horizontal axis of graph 500 are relative to each wireless signal 510 and 520, and the wireless signals 510 and 520 may be concurrent, overlapping, or entirely separate.

In the particular example illustrated at FIG. 5, the wireless signals are WI-FI® signals, and graph 500 represents the signal strength in terms of normalized Channel State Information (CSI) amplitude of each wireless signal 510 and 520 over time, e.g., over a time period immediately preceding the cooktop appliance 100 being turned on, or preceding the cooktop appliance 100 being turned on within a margin of time sufficient for a user to traverse the distance from a first point, the first point between the router 400 (FIG. 4) and the cooktop appliance 100 along the signal path, to a second point at or within reach of the cooktop appliance 100 itself. For example, the time during which the user (which may be a protected user or an authorized user, as discussed above) is moving, e.g., approaches the cooktop appliance 100 and passes between the router 400 (FIG. 4) and the cooktop appliance 100, may be the span 502 indicated in FIG. 5. As may be seen in FIG. 5, any object, e.g., user, between the transmitter, e.g., router, and the cooktop appliance will obstruct some of the wireless signals 510 and 520, however, it may also be seen that some objects, e.g., larger objects such as a larger user, may inhibit the wireless signal more than other, smaller, objects such as smaller users. For example, as illustrated in FIG. 5, the strength of second wireless signal 520 decreases more than the strength of first wireless signal 510 decreases over the span 502, e.g., when a user is approaching the cooktop appliance. The change, e.g., decrease, in each wireless signal may be measured in various ways, such as may be measured as total or average decrease across the span 502 or may be a largest instantaneous decrease at any point within the span 502, or other suitable quantifications of the change in signal strength over or during the time span 502, where the decrease in each signal is quantified in the same way in order to provide a direct comparison of first wireless signal 510 and second wireless signal 520 (and additional signals may be compared as well in some embodiments, e.g., third wireless signal, fourth wireless signal, etc.). Thus, based on the greater decrease in second wireless signal 520, it may be determined that a larger user, such as an adult human, travelled between the transmitter, e.g., router, and the cooktop appliance as compared to the first wireless signal 510 due to the smaller decrease in the first wireless signal 510 over or during span 502. Accordingly, a presence of an authorized user such as an adult human may be detected or determined based on the second wireless signal 520, whereas a presence of a protected user such as a pet or human child may be detected or determined based on the first wireless signal 510. For example, when only the first wireless signal 510 is received, it may be determined that a protected user is present at the cooktop appliance and an authorized user is absent from the cooktop appliance.

Embodiments of the present subject matter may also include methods for operating a cooktop appliance, such as cooktop appliance 100. In this regard, for example, controller 170 may be configured for implementing some or all steps of one or more of the following exemplary methods. However, it should be appreciated that the exemplary methods are discussed herein only to describe exemplary aspects of the present subject matter, and are not intended to be limiting.

Exemplary methods according to the present subject matter may include steps and/or features for detecting a protected user and/or distinguishing a protected user from an authorized user. Such protected users may, by way of example, be pets or children. These examples are provided for illustrative purposes only, the protected user or users in methods according to the present disclosure may include children, elderly persons, persons with physical and/or intellectual disability, or other users who may not be suitable for unsupervised or unassisted operation of the oven appliance.

Figure 6:
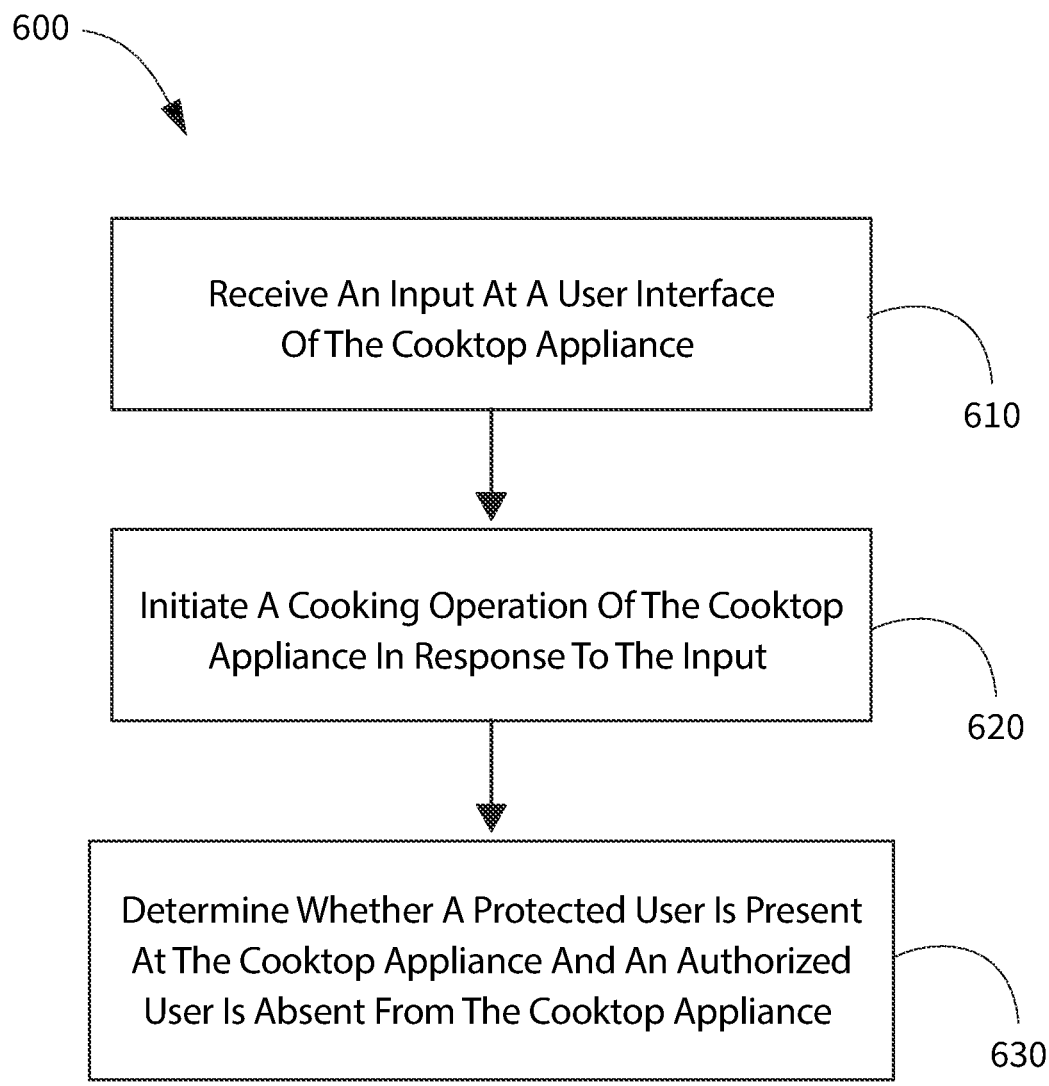
FIG. 6 provides a flow diagram of an exemplary method for operating an oven appliance according to one or more exemplary embodiments of the present subject matter.

An exemplary method 600 of operating a cooktop appliance is illustrated in FIG. 6. As illustrated in FIG. 6, the method 600 may include an initial step 610 of receiving an input at a user interface, e.g., user interface panel 154 or knobs 156, of the cooktop appliance. For example, the input may be received from the user interface by the controller 170 of the cooktop appliance.

Method 600 may also include a step 620 of initiating a cooking operation of the cooktop appliance in response to the input received from the user interface. For example, initiating the cooking operation may include causing, e.g., by the controller 170 in response to the user input received at the control panel 154, one or more heating elements and/or burners of the cooktop appliance to emit heat, such as by igniting a flame (e.g., in a cooktop with gas burners) or energizing a resistance heating element, etc. Additionally, activating the cooktop appliance, such as turning the cooktop appliance ON or initiating a cooking operation, may also or instead include energizing an induction coil of an induction heating element, e.g., wherein the induction heating element may not directly emit heat but unattended operation of such heating elements by a protected user is nonetheless not desirable.

Method 600 may further include a step 630 of determining, after initiating the cooking operation, whether a protected user is present at the cooktop appliance and an authorized user is absent from the cooktop appliance. Method 600 may thus advantageously provide protected user detection while also defaulting to normal operation of the cooktop appliance, e.g., by performing step 630 after initiating the cooktop operation. As such, the convenience to the user may be increased such as by not requiring an authorized user to perform additional steps, e.g., unlocking the appliance, prior to using the appliance. Thus, included among the several advantages which embodiments of the present disclosure may provide, such methods may provide an improved, e.g., more convenient, secure operation of the cooktop appliance.

When a protected user is detected and an authorized user is not detected (an absence of the authorized user is determined), e.g., when the determination at step 630 in FIG. 6 is positive, the method 600 may include one or more remedial actions. For example, such actions may include sounding an alarm and/or providing a user notification, e.g., at the user interface such as on the display 155 of the user interface panel 154. For example, the alarm may be a local alarm, e.g., on the cooktop appliance. Also by way of example, the notification may be sent to a remote user interface device, such as a text message sent to a phone, an email which may be accessible on various devices, an audible notification broadcast from a smart speaker, or other suitable user notification. In particular, the local alarm may deter or repel the protected user from touching the cooktop appliance, and the user notification sent to the remote user interface device may inform an absent authorized user of the presence of the protected user near the cooktop appliance while the cooktop appliance is operating, e.g., when one or more of the burner assemblies is activated. The absent user may be, for example, an authorized or unprotected user, e.g., an adult, who may have left the kitchen and/or whose attention may have been diverted from the cooktop appliance and/or protected user.

In some embodiments, the user notification may be or may include a prompt for a confirmation input, such as a prompt provided on a remote user interface device associated with a user account of an authorized user. For example, the remote user interface device may be a smartphone (or tablet, etc.) and may be associated with the user account in that the remote user interface device is commissioned to the user account of an authorized user, e.g., in a remote database such as in the cloud (or the edge or the fog or other similar distributed computing environment or computer network).

Some embodiments may further include starting a timer in response to determining the protected user is present at the cooktop appliance and the authorized user is absent from the cooktop appliance. In such embodiments, when a confirmation input is received after starting the timer, the timer may then be cancelled, e.g., such embodiments may include receiving a confirmation input after starting the timer and cancelling the timer in response to the confirmation input. For example, the confirmation input may be received at a local user interface of the cooktop appliance, e.g., user interface panel 154, or may be received at a remote user interface device, such as in response to a prompt for a confirmation input provided on the remote user interface device as described above. When the timer elapses, e.g., when no confirmation input is received after starting the timer, such embodiments may include terminating the cooking operation in response. For example, terminating the cooking operation may include deactivating all heating elements of the cooktop appliance.

In some embodiments, exemplary methods such as method 600 may also include monitoring a wireless signal while the cooktop appliance is in an OFF condition prior to receiving the input. In such embodiments, determining whether the protected user is present at the cooktop appliance and the authorized user is absent from the cooktop appliance may be based on the monitored wireless signal. For example, monitoring the wireless signal may include monitoring channel state information of the wireless signal over time prior to receiving the input, and determining whether the protected user is present at the cooktop appliance and the authorized user is absent from the cooktop appliance may be based on the monitored channel state information of the wireless signal. Such determinations based on the wireless signal may include detecting a drop in the monitored channel state information having a magnitude less than a predetermined threshold. For example, such a small drop in the signal strength, e.g., less than the predetermined threshold, may indicate a smaller user approached the cooktop appliance prior to the activation, and the smaller user may be a protected user, e.g., a human child or a pet, e.g., as described above with reference to FIG. 5.

Figure 7:
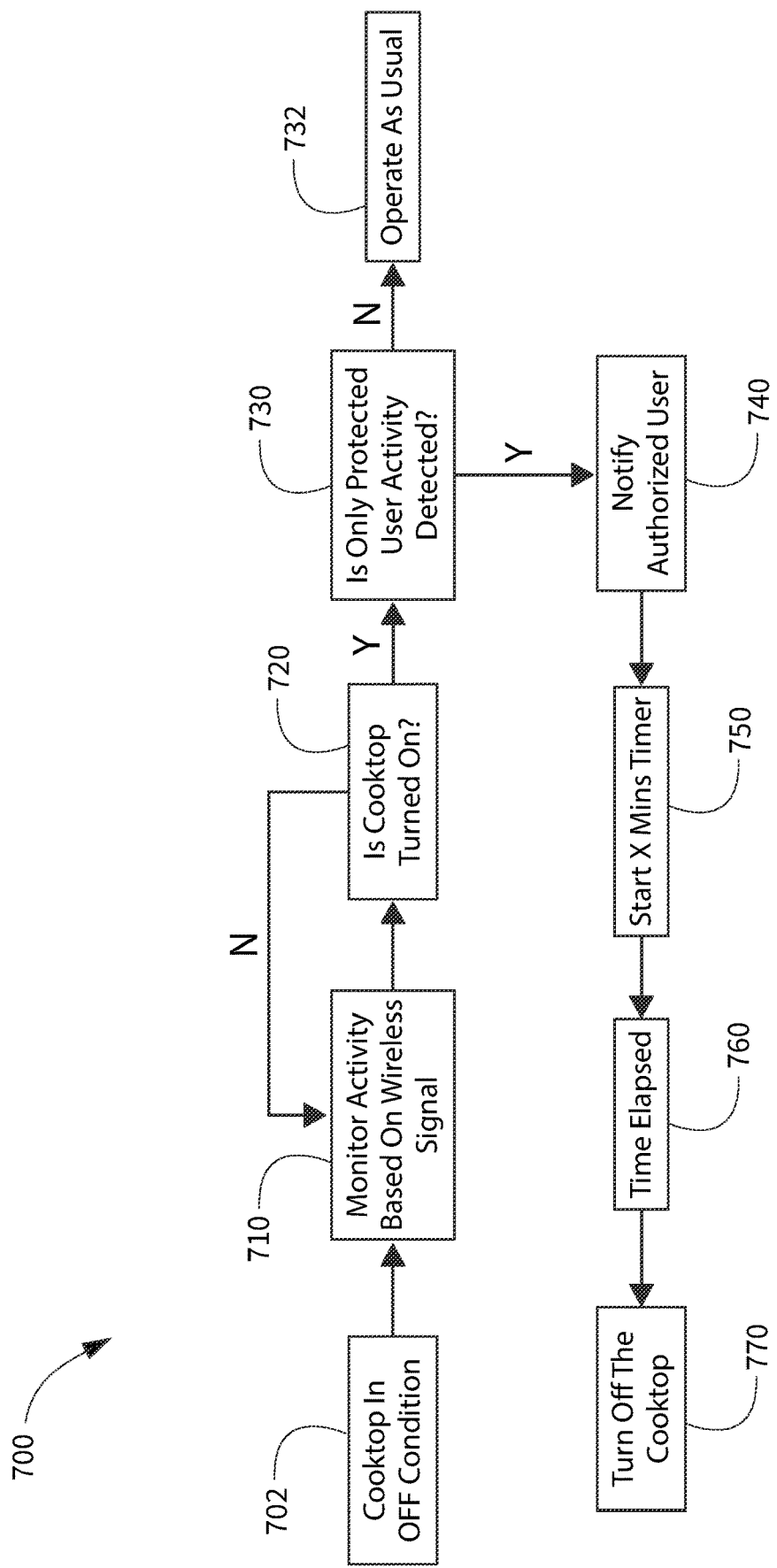
FIG. 7 provides a flow diagram of an additional exemplary method for operating an oven appliance according to one or more exemplary embodiments of the present subject matter.

Another exemplary method 700 of operating a cooktop appliance, such as cooktop appliance 100, according to one or more additional exemplary embodiments of the present disclosure is illustrated in FIG. 7. As illustrated in FIG. 7, the method 700 begins at 702 while the cooktop appliance is in an OFF condition, e.g., when no heat is provided by any heating elements of the cooktop appliance, such as when a cooking operation is not active and no fuel, e.g., gas, or power, e.g., electric current, is supplied to any of the heating elements.

While the cooktop appliance is in the OFF condition, method 700 may include a step 710 of monitoring activity based on a wireless signal, which may be a WI-FI® signal received by the cooktop appliance. Method 700 may also include a determination 720, e.g., of whether the cooktop appliance has been turned ON, e.g., whether an input has been received. When the cooktop appliance has not been turned ON, method 700 may return to step 710 and continue to monitor for activity based on the wireless signal. When the cooktop appliance has been turned ON, method 700 may proceed to step 730 of determining whether only a protected user has been detected, e.g., based on the monitored wireless signal. When the output of step 730 is negative, e.g., when an authorized user has been detected or the protected user activity is not the only activity detected, the cooktop appliance may then operate as usual, e.g., as indicated at 732 in FIG. 7, thereby providing secure operation with increased convenience, as discussed above. When the output of step 730 is positive, e.g., when only protected user activity is detected, method 700 may go to step 740 of notifying an authorized user, such as by providing a user notification on the cooktop appliance or a remote user interface device.

Method 700 may also include starting a timer, e.g., having a duration of X minutes, as indicated at 750 in FIG. 7. As illustrated in FIG. 7, when the timer elapses (760), e.g., without a response from the authorized user, the cooktop appliance may be turned OFF (770). In other instances, when the response from the authorized user is received before the timer elapses, the cooktop appliance may then operate as usual, e.g., method 700 may go to step 732. Thus, exemplary methods of the present disclosure may advantageously only require additional action by the authorized user when only protected user activity is detected, thereby providing improved convenience as compared to always requiring user authentication to unlock the appliance.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating a cooktop appliance, the method comprising:
   receiving a wireless signal from a transmitter;
   monitoring channel state information of the wireless signal while the cooktop appliance is in an off condition;
   receiving an input at a user interface of the cooktop appliance;
   detecting a drop in the monitored channel state information prior to receiving the input;
   initiating a cooking operation of the cooktop appliance in response to the input; and
   determining, after initiating the cooking operation, whether a protected user is present at the cooktop appliance and an authorized user is absent from the cooktop appliance based on the drop in the monitored channel state information having a magnitude less than a predetermined threshold, wherein the magnitude of the drop in the monitored channel state information is proportional to an obstruction between the transmitter and the cooktop appliance.

2. The method of claim 1, wherein monitoring the channel state information of the wireless signal comprises monitoring channel state information of the wireless signal over time prior to receiving the input.

3. The method of claim 1, further comprising providing a user notification in response to determining the protected user is present at the cooktop appliance and the authorized user is absent from the cooktop appliance.

4. The method of claim 3, wherein the user notification is a prompt for a confirmation input.

5. The method of claim 1, further comprising starting a timer in response to determining the protected user is present at the cooktop appliance and the authorized user is absent from the cooktop appliance.

6. The method of claim 5, further comprising receiving a confirmation input after starting the timer and cancelling the timer in response to the confirmation input.

7. The method of claim 5, further comprising terminating the cooking operation of the cooktop appliance in response to the timer elapsing.

8. A cooktop appliance, comprising:
   a controller, the controller operable for:
      receiving a wireless signal from a transmitter;
      monitoring channel state information of the wireless signal while the cooktop appliance is in an off condition;
      receiving an input from a user interface of the cooktop appliance;
      detecting a drop in the monitored channel state information prior to receiving the input;
      initiating a cooking operation of the cooktop appliance in response to the input; and
      determining, after initiating the cooking operation, whether a protected user is present at the cooktop appliance and an authorized user is absent from the cooktop appliance based on the drop in the monitored channel state information having a magnitude less than a predetermined threshold, wherein the magnitude of the drop in the monitored channel state information is proportional to an obstruction between the transmitter and the cooktop appliance.

9. The cooktop appliance of claim 8, wherein monitoring the channel state information of the wireless signal comprises monitoring channel state information of the wireless signal over time prior to receiving the input.

10. The cooktop appliance of claim 8, wherein the controller is further operable for providing a user notification in response to determining the protected user is present at the cooktop appliance and the authorized user is absent from the cooktop appliance.

11. The cooktop appliance of claim 10, wherein the user notification is a prompt for a confirmation input.

12. The cooktop appliance of claim 8, wherein the controller is further operable for starting a timer in response to determining the protected user is present at the cooktop appliance and the authorized user is absent from the cooktop appliance.

13. The cooktop appliance of claim 12, wherein the controller is further operable for receiving a confirmation input after starting the timer and cancelling the timer in response to the confirmation input.

14. The cooktop appliance of claim 12, wherein the controller is further operable for terminating the cooking operation of the cooktop appliance in response to the timer elapsing.

15. A method of operating a cooking appliance, the method comprising:
   monitoring channel state information of a wireless signal from a transmitter over time while the cooking appliance is in an off condition;
   initiating a cooking operation of the cooking appliance;
   detecting a drop in the monitored channel state information prior to receiving the input; and
   determining, after initiating the cooking operation, a protected user is present at the cooking appliance and an authorized user is absent from the cooking appliance based on the drop in the monitored channel state information having a magnitude less than a predetermined threshold, wherein the magnitude of the drop in the monitored channel state information is proportional to an obstruction between the transmitter and the cooking appliance; and
   terminating the cooking operation of the cooktop appliance in response to determining the protected user is present at the cooking appliance and the authorized user is absent from the cooking appliance.

16. The method of claim 15, wherein the drop is a first drop, further comprising detecting a second drop in the monitored channel state information, and determining an authorized user is present at the cooking appliance based on the second drop in the monitored channel state information having a magnitude greater than the predetermined threshold.

* * * * *